United States Patent
Garsuch et al.

(10) Patent No.: US 10,074,873 B2
(45) Date of Patent: Sep. 11, 2018

(54) INORGANIC COORDINATION POLYMERS AS GELLING AGENTS

(71) Applicant: BASF SE, Ludwigshafen (DE)

(72) Inventors: Arnd Garsuch, Ludwigshafen (DE); Michael Schmidt, Alsbach-Haehnlein (DE); Rene Schmitz, Stuttgart (DE); Ingo Krossing, Freiburg (DE); Philipp Eiden, Heidelberg (DE); Stefanie Reininger, Freiburg (DE); Mario Schleep, Freiburg (DE)

(73) Assignee: BASF SE, Ludwigshafen (DE)

( * ) Notice: Subject to any disclaimer, the term of this patent is extended or adjusted under 35 U.S.C. 154(b) by 190 days.

(21) Appl. No.: 15/121,613

(22) PCT Filed: Feb. 25, 2015

(86) PCT No.: PCT/EP2015/053905
§ 371 (c)(1),
(2) Date: Aug. 25, 2016

(87) PCT Pub. No.: WO2015/128363
PCT Pub. Date: Sep. 3, 2015

(65) Prior Publication Data
US 2016/0365605 A1    Dec. 15, 2016

(30) Foreign Application Priority Data
Feb. 26, 2014  (EP) .................................... 14156852

(51) Int. Cl.
*H01M 10/0565* (2010.01)
*H01M 10/0525* (2010.01)
*H01M 10/052* (2010.01)

(52) U.S. Cl.
CPC ... *H01M 10/0565* (2013.01); *H01M 10/0525* (2013.01); *H01M 10/052* (2013.01);
(Continued)

(58) Field of Classification Search
CPC ......... H01M 10/0565; H01M 10/0525; H01M 2300/0082; H01M 2300/0085; H01M 10/052
See application file for complete search history.

(56) References Cited

U.S. PATENT DOCUMENTS

| 4,039,636 A | 8/1977 | Claus et al. |
| 2017/0054178 A1* | 2/2017 | Sakaguchi .......... H01M 10/052 |

FOREIGN PATENT DOCUMENTS

| JP | 2001-354485 | 12/2001 |
| JP | 2014-22333 | 2/2014 |

OTHER PUBLICATIONS

Tariq Mahmood, et al., "Polyfluoroalkyl Dibasic Acid Phosphates, Bis( polyfluoroalkyl) Monobasic Acid Phosphates, and Their Precursors" Inorganic Chemistry, vol. 25, No. 21, 1986, pp. 3830-3837.
(Continued)

*Primary Examiner* — Stewart A Fraser
(74) *Attorney, Agent, or Firm* — Oblon, McClelland, Maier & Neustadt, L.L.P.

(57) ABSTRACT

Use of a compound of formula (I) wherein $R^1$ and $R_2$ are selected independently from each other from C1-C10 alkyl, which may be substituted by one or more F, or wherein $R^1$ and $R^2$ are linked and jointly selected from C2-C3 alkanediyl forming together with the group —OPO—a five- or six-membered heterocycle which may be substituted by one or more substituents selected from F and optionally fluorinated $C_1$-$C_{10}$ alkyl, as gelling agent in an aprotic organic solvent or solvent mixture.

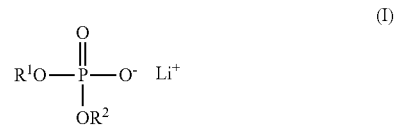

10 Claims, 3 Drawing Sheets

(52) U.S. Cl.
CPC ............... *H01M 2300/0082* (2013.01); *H01M 2300/0085* (2013.01)

(56) References Cited

OTHER PUBLICATIONS

E. Markevich, et al., "Reasons for Capacity Fading of LiCoPO$_4$ Cathodes in LiPF$_6$ Containing Electrolyte Solutions" Electrochemistry Communications, vol. 15, 2012, pp. 22-25.

Ran Elazari, et al., "Rechargeable Lithiated Silicon—Sulfur (SLS) Battery Prototypes" Electrochemistry Communications, vol. 14, 2012, pp. 21-24.

International Search Report dated Apr. 29, 2015 in PCT/EP2015/053905 filed Feb. 25, 2015.

International Preliminary Report on Patentability and Written Opinion dated Aug. 30, 2016 filed Feb. 25, 2015.

J. Kumamoto, "Vibrational Frequencies of Phosphate Derivatives", Spectrochimica Acta; 1965, vol. 21, No. 3, XP026566855, pp. 345-350.

\* cited by examiner

INORGANIC COORDINATION POLYMERS AS GELLING AGENTS

The present invention relates to the use of lithium fluoroalkylphosphates of formula (I)

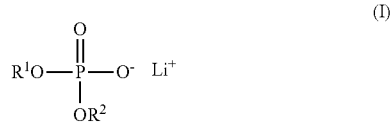

wherein $R^1$ and $R^2$ are selected independently from each other from $C_1$-$C_{10}$ alkyl, which may be substituted by one or more F, or wherein $R^1$ and $R^2$ are linked and jointly selected from $C_2$-$C_3$ alkanediyl forming together with the group —OPO— a five- or six-membered heterocycle which may be substituted by one or more substituents selected from F and optionally fluorinated $C_1$-$C_{10}$ alkyl as gelling agent in aprotic organic solvents and to their use as additives for electrolytes in electrochemical cells. Furthermore, the present invention relates to an electrolyte composition containing said lithium fluoroalkylphosphates and to electrochemical cells containing said electrolyte composition.

Storing electrical energy is a subject of still growing interest. Efficient storage of electric energy would allow electric energy to be generated when it is advantageous and used when needed. At present Lithium ion accumulators, frequently also referred to as lithium ion batteries, are widely used for providing electric energy, especially in portable devices like laptops and mobile phones but are also used in electric mobility. Lithium ion batteries provide higher energy densities than accumulators based on lead or comparatively noble heavy metals.

Electrochemical cells like lithium ion batteries comprise a cathode, an anode and an electrolyte composition comprising a conducting salt for ion exchange between cathode and anode. Different kinds of electrolyte compositions are known, the most commonly used are liquid electrolytes, but solid electrolytes and gel electrolytes are also used.

Solid electrolytes are materials that conduct electricity by ionic diffusion. Suited materials are e.g. polymers like polyethylene oxides or polyvinylidene fluoride. The polymers are mixed with conducting salts. Polymer electrolytes show mechanical stability and low volatility but only low conductivity. Liquid electrolytes are usually composed of one or more solvents and a conducting salt solvated therein and optionally further additives. Liquid electrolytes usually show good ion conductivity but the electrochemical cells have to be sealed to avoid loss of electrolyte. Gel electrolytes are in between these two. They are formed by a solid material like polymers and a liquid solvent which is associated with the solid material forming a gel and contain a conducting salt. Usually only small amounts of the solid material are necessary to form the gel. The high amount of solvent leads to an increased conductivity of gel electrolytes in comparison to solid electrolytes. Nevertheless, the solvent is bound in the gel and the danger of solvent leakage is lower than in liquid electrolytes.

The current development in the field of lithium ion batteries is directed towards cells of higher voltages leading to higher energy densities. High voltage cathode materials like $LiCoPO_4$ and manganese-containing spinels show voltages of more than 4.5 V against $Li/Li^+$. The electrolytes used in combination with these materials have to show good electrochemical stability and good compatibility with the electrode materials to provide electrochemical cells with long lifetime. These requirements apply to the solvents, the conducting salts and possible other components of the electrolyte composition which should not be consumed during the lifetime of the electrochemical cell. Additionally the requirements of good conductivity and high safety of the electrolyte compositions have to be fulfilled.

It was an object of the present invention to provide electrolyte compositions for electrochemical cells, in particular lithium ion batteries showing good conductivity, safety properties, and good electrochemical stability at higher voltages. A further object of the present invention was to provide electrochemical cells, in particular lithium ion batteries showing good safety properties and long lifetime, in particular electrochemical cells with high energy density.

This object is achieved by the use of compounds of formula (I)

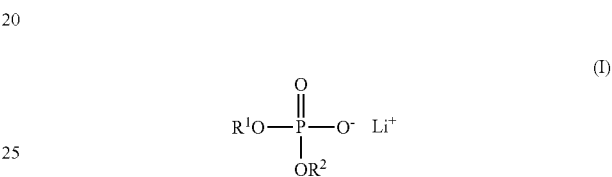

wherein
$R^1$ and $R^2$ are selected independently from each other from $C_1$-$C_{10}$ alkyl, which may be substituted by one or more F,
or wherein
$R^1$ and $R^2$ are linked and jointly selected from $C_2$-$C_3$ alkanediyl forming together with the group —OPO— a five- or six-membered heterocycle which may be substituted by one or more substituents selected from F and optionally fluorinated $C_1$-$C_{10}$ alkyl as gelling agent in aprotic organic solvents and as additives in electrolytes for electrochemical cells.

This object is also achieved by an electrolyte composition (A) containing
(i) at least one aprotic organic solvent,
(ii) at least one compound of formula (I),
(iii) at least one conducting salt different from the compound of formula (I), and
(iv) optionally at least one further additive,
and by an electrochemical cell comprising the electrolyte composition (A).

Figure 1:
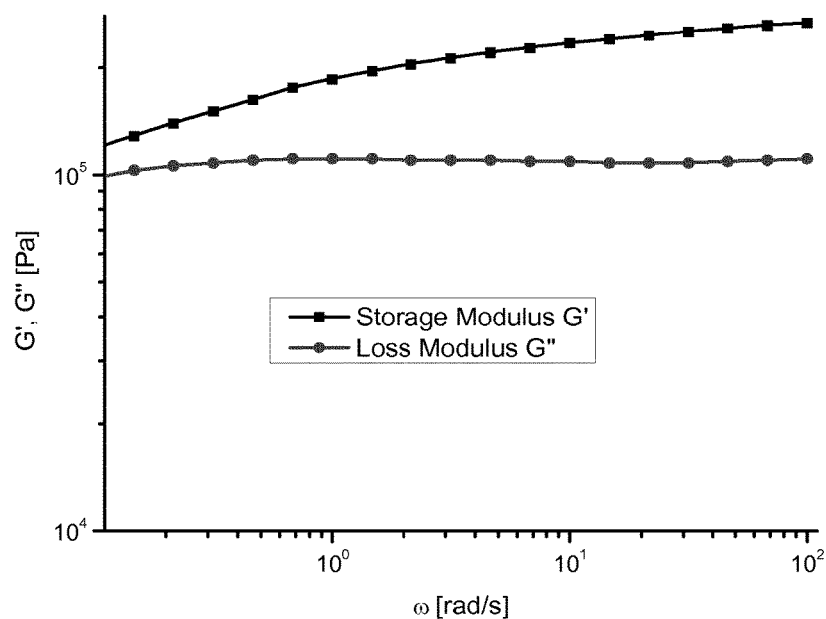
FIG. 1 shows the result of a deformation sweep of a rheological measurement.

The compounds of general formula (I) form coordination polymers upon addition to organic aprotic solvents like carbonates. This means, the low molecular compounds of formula (I) form Li metal complexes in the solvent which are joined via coordinative bonds resulting in large molecules called coordination polymers. The formation of the coordination polymers by the low molecular compounds has the effect of a gelling agent in the aprotic organic solvent. The presence of only a small amount of a compound of general formula (I) to the aprotic organic solvent is sufficient to obtain a gel formed by a network of the coordination polymers which is filled by the solvent(s). It is possible to use the aprotic organic solvents and solvent mixtures commonly used in electrolyte compositions for electrochemical cells, e.g. carbonates and ethers. Common conducting salts are easily included in the gel. Consequently these gels provide a good basis for electrolyte compositions with lower risk of leakage of solvent. The use of the compounds of formula (I) as gelling agent is in particular advantageous in electrolyte compositions for electrochemical cells wherein lithium ions are used for the ion transfer between anode and cathode like in lithium ion batteries or lithium sulphur batteries since no detrimental ion species like $Na^+$ or transition metal ions are introduced into the cell. The compounds of formula (I) are electrochemically stable up to 5 V.

Due to the inorganic part the compounds of formula (I) and the coordination polymers formed by the compounds of formula (I) are less flammable than conventional organic polymers, in particular if the substituents $R^1$ and/or $R^2$ are substituted by F. This also leads to improved flame protection of the electrolyte composition.

The inventive electrolyte composition (A) contains at least one aprotic organic solvent (i), preferably at least two aprotic organic solvents (i). According to one embodiment the electrolyte composition (A) may contain up to ten aprotic organic solvents (i).

The at least one aprotic organic solvent (i) is preferably selected from (a) cyclic and acyclic organic carbonates, which may be partly halogenated, (b) di-$C_1$-$C_{10}$-alkylethers, which may be partly halogenated, (c) di-$C_1$-$C_4$-alkyl-$C_2$-$C_6$-alkylene ethers and polyethers, which may be partly halogenated, (d) cyclic ethers, which may be partly halogenated, (e) cyclic and acyclic acetals and ketals, which may be partly halogenated, (f) ortho esters, which may be partly halogenated, (g) cyclic and acyclic esters of carboxylic acids, which may be partly halogenated, (h) cyclic and acyclic sulfones, which may be partly halogenated, (i) cyclic and acyclic nitriles and dinitriles, which may be partly halogenated, and (j) ionic liquids, which may be partly halogenated.

More preferred, the at least one aprotic organic solvent (i) is selected from cyclic and acyclic organic carbonates (a), di-$C_1$-$C_{10}$-alkylethers (b), di-$C_1$-$C_4$-alkyl-$C_2$-$C_6$-alkylene ethers and polyethers (c) and cyclic ethers (d), even more preferred the at least one aprotic organic solvent (i) is selected from cyclic and acyclic organic carbonates (a) and most preferred the at least one aprotic organic solvent (i) is a mixture of at least two aprotic organic solvents (i) selected from cyclic and acyclic organic carbonates (a), in particular preferred the at least one aprotic organic solvent (i) is a mixture of at least one cyclic organic carbonate and at least one acyclic organic carbonate.

The aprotic organic solvents (a) to (j) may be partly halogenated, e.g. they may be partly fluorinated, partly chlorinated or partly brominated, and preferably they may be partly fluorinated. "Partly halogenated" means, that one or more H of the respective molecule is substituted by a halogen atom, e.g. by F, Cl or Br. Preference is given to the substitution by F. The at least one solvent (i) may be selected from partly halogenated and non-halogenated aprotic organic solvents (a) to (j), i.e. the electrolyte composition may contain a mixture of partly halogenated and non-halogenated aprotic organic solvents.

Examples of suitable organic carbonates (a) are cyclic organic carbonates according to the general formula (a1), (a2) or (a3)

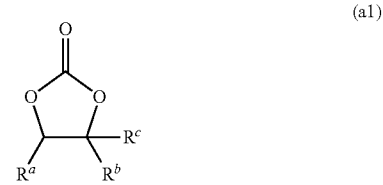

(a1)

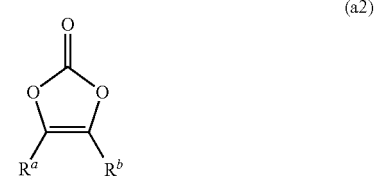

(a2)

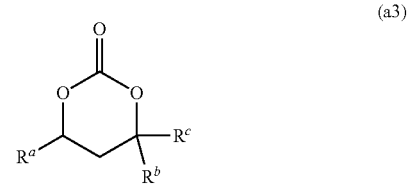

(a3)

wherein $R^a$, $R^b$ and $R^c$ being different or equal and being independently from each other selected from hydrogen; $C_1$-$C_4$-alkyl, preferably methyl; F; and $C_1$-$C_4$-alkyl substituted by one or more F, e.g. $CF_3$.

"$C_1$-$C_4$-alkyl" is intended to include methyl, ethyl, n-propyl, iso-propyl, n-butyl, iso-butyl, sec.-butyl and tert.-butyl.

Preferred cyclic organic carbonates (a) are of general formula (a1), (a2) or (a3) wherein $R^a$, $R^b$ and $R^c$ are H. Examples are ethylene carbonate, vinylene carbonate, and propylene carbonate. A preferred cyclic organic carbonate (a) is ethylene carbonate. Further preferred cyclic organic carbonates (a) are difluoroethylene carbonate (a4) and monofluoroethylene carbonate (a5)

(a4)

(a5)

Examples of suitable acyclic organic carbonates (a) are dimethyl carbonate, diethyl carbonate, methylethyl carbonate and mixtures thereof.

In one embodiment of the invention the electrolyte composition (A) contains mixtures of acyclic organic carbonates (a) and cyclic organic carbonates (a) at a ratio by weight of from 1:10 to 10:1, preferred of from 3:1 to 1:1.

Examples of suitable acyclic di-$C_1$-$C_{10}$-alkylethers (b) are dimethylether, ethylmethylether, diethylether, diisopropylether, and di-n-butylether.

Examples of di-$C_1$-$C_4$-alkyl-$C_2$-$C_6$-alkylene ethers (c) are 1,2-dimethoxyethane, 1,2-diethoxy-ethane, diglyme (diethylene glycol dimethyl ether), triglyme (triethylene glycol dimethyl ether), tetraglyme (tetraethylene glycol dimethyl ether), and diethylene glycol diethyl ether.

Examples of suitable polyethers (c) are polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of suitable cyclic ethers (d) are tetrahydrofurane and 1,4-dioxane.

Examples of suitable acyclic acetals (e) are 1,1-dimethoxymethane and 1,1-diethoxymethane. Examples for suitable cyclic acetals (e) are 1,3-dioxane and 1,3-dioxolane.

Examples of suitable ortho esters (f) are tri-$C_1$-$C_4$ alkoxy methane, in particular trimethoxymethane and triethoxymethane. Examples of suitable cyclic ortho esters (f) are 1,4-dimethyl-3,5,8-trioxabicyclo[2.2.2]octane and 4-ethyl-1-methyl-3,5,8-trioxabicyclo[2.2.2]octane.

Examples of suitable acyclic esters of carboxylic acids (g) are ethyl acetate, methyl butanoate, and esters of dicarboxylic acids like 1,3-dimethyl propanedioate. An example of a suitable cyclic ester of carboxylic acids (lactones) is γ-butyrolactone.

Examples of suitable cyclic and acyclic sulfones (h) are ethyl methyl sulfones, dimethyl sulfone and tetrahydrothiophene-S,S-dioxide.

Examples of suitable cyclic and acyclic nitriles and dinitriles (i) are adipodinitrile, acetonitrile, propionitrile, butyronitrile.

The water content of the inventive electrolyte composition is preferably below 100 ppm, based on the weight of the electrolyte composition, more preferred below 50 ppm, most preferred below 30 ppm. The water content may be determined by titration according to Karl Fischer, e.g. described in detail in DIN 51777 or ISO760: 1978.

The content of HF of the inventive electrolyte composition is preferably below 60 ppm, based on the weight of the electrolyte composition, more preferred below 40 ppm, most preferred below 20 ppm. The HF content may be determined by titration according to potentiometric or potentiographic titration method.

The inventive electrolyte composition (A) contains as component (ii) at least one compound of formula (I)

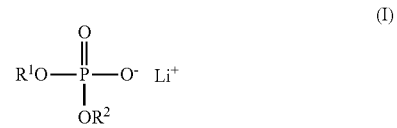

wherein $R^1$ and $R^2$ are selected independently from each other from $C_1$-$C_{10}$ alkyl, which may be substituted by one or more F, or wherein $R^1$ and $R^2$ are linked and jointly selected from $C_2$-$C_3$ alkanediyl forming together with the group —OPO— a five- or six-membered heterocycle which may be substituted by one or more substituents selected from F and optionally fluorinated $C_1$-$C_{10}$ alkyl.

Examples of compounds of formula (I) wherein $R^1$ and $R^2$ are linked and jointly selected from $C_2$-$C_3$ alkanediyl forming together with the group —OPO— a five- or six-membered heterocycle are shown below:

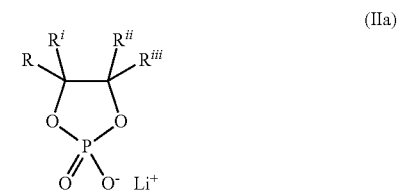

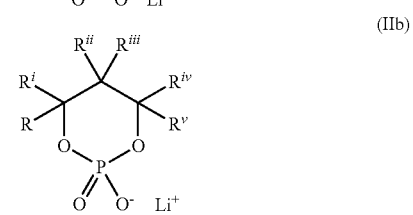

wherein R, $R^i$, $R^{ii}$, $R^{iii}$, $R^{iv}$, and $R^v$ are independently from each other selected from H, F and optionally fluorinated $C_1$-$C_{10}$ alkyl.

Preferably $R^1$ and $R^2$ are selected independently from each other from $C_1$-$C_4$ alkyl which is substituted by one or more F or wherein $R^1$ and $R^2$ are linked and jointly selected from $C_2$-alkanediyl which may be substituted by one or more substituents selected from F and optionally fluorinated $C_1$-$C_{10}$ alkyl.

The term "$C_1$-$C_{10}$ alkyl" as used herein means a straight or branched saturated hydrocarbon group with 1 to 10 carbon atoms having one free valence and includes, e.g., methyl, ethyl, n-propyl, isopropyl, n-butyl, sec-butyl, isobutyl, tert-butyl, n-pentyl, iso-pentyl, 2,2-dimethylpropyl, n-hexyl, iso-hexyl, 2-ethyl hexyl, n-heptyl, iso-heptyl, n-octyl, iso-octyl, n-nonyl, n-decyl and the like. Preferred are $C_1$-$C_4$ alkyl.

The term "$C_2$-$C_3$ alkanediyl" as used herein denotes a saturated hydrocarbon group with 2 to 3 carbon atoms and has two free valences. $C_2$-$C_3$ alkanediyl includes e.g. —$CH_2CH_2$— and —$CH_2CH_2CH_2$—.

Preferably the at least one compound of formula (I) is selected from compounds of formula (I) wherein at least one of $R^1$ and $R^2$ is substituted by at least one F, more preferred at least one of $R^1$ and $R^2$ is substituted by at least two F and most preferred at least one of $R^1$ and $R^2$ is substituted by at least three F. In particular preferred at least one of $R^1$ and $R^2$ contains at least one $CF_3$-group.

According to one embodiment of the present invention the at least one compound of formula (I) is selected from compounds of formula (I) wherein $R^1$ and $R^2$ are selected independently from each other from optionally fluorinated $C_1$-$C_4$ alkyl. Preferably at least one of $R^1$ and $R^2$ substituted by one or more F, more preferred at least one of $R^1$ and $R^2$ is substituted by at least two F, even more preferred at least one of $R^1$ and $R^2$ is substituted by at least three F. In particular preferred at least one of $R^1$ and $R^2$ contains at least one $CF_3$-group.

According to another embodiment the at least one compound of formula (I) is selected from compounds of formula (I) wherein $R^1$ and $R^2$ are linked and jointly selected from $C_2$-alkanediyl forming together with the group —OPO— a five-membered heterocycle which may be substituted by one or more substituents selected from F and optionally fluorinated $C_1$-$C_{10}$ alkyl, preferably the $C_2$-alkanediyl group contains at least one F, more preferred at least two F, even more preferred at least three F. In particular preferred the five-membered heterocycle contains at least one $CF_3$-group.

Preferred compounds of formula (I) are $LiOOP(OCH_2CF_3)_2$, $LiOOP(OCH(CF_3)_2)_2$, $LiOOP(On\text{-}C_4F_9)_2$, and $LiOOP(OC(CF_3)_3)_2$.

Different preparation methods are known for the optionally fluorinated lithium alkylphosphate compounds of formula (I). One possibility is the preparation by reacting the corresponding (fluoro)alkylphosphoric acid with a deprotonating agent like lithium hydride or butyllithium. The preparation of the corresponding (fluoro)alkylphosphoric acids is e.g. described in Mahmood, T. and Shreeve, J. M., Inorg. Chem. 25, pages 3830 to 3837 (1986). Another possibility is the reaction of the respective lithium (fluoro)alkoxides with phosphorus pentoxide. Another object of the present invention is the preparation of the compounds of formula (I) by reacting $LiOR^1$, $LiOR^2$ and/or $LiOR^1R^2OLi$ with phosphorus pentoxide, wherein $R^1$ and $R^2$ are defined as above and $R^1R^2$ denotes the moiety wherein $R^1$ and $R^2$ are linked and jointly selected from $C_2$-$C_3$ alkanediyl which may be substituted by one or more F and/or optionally fluorinated $C_1$-$C_{10}$ alkyl. $LiOR^1$, $LiOR^2$ and/or $LiOR^1R^2OLi$ can easily be prepared by reacting the corresponding alcohols with a deprotonating agent like lithium hydride or butyllithium. $LiOR^1$, $LiOR^2$ and/or $LiOR^1R^2OLi$ and phosphorus pentoxide are usually reacted in the presence of an aprotic solvent like carbonates, e.g. dimethylcarbonate. The reaction temperature is usually above room temperature, e.g. a suitable temperature range is 50 to 120° C. Lithium bis-(2,2,2-trifluoroethyl)phosphate can also prepared by the direct reaction of the corresponding alcohol with phosphorus pentoxide followed by deprotonation with a deprotonating agent like lithium hydride or butyllithium.

Electrolyte composition (A) usually contains at least 0.01 mol/L of the at least one compound of formula (I). The maximum concentration of the at least one compound of formula (I) is usually 5 mol/L. In the case the compounds of formula (I) are used as gelling agent in the electrolyte composition the concentration of the at least one compound of formula (I) is preferably in the range of 0.1 to 5 mol/L, more preferred 0.15 to 3 mol/L and most preferred 0.2 to 2 mol/L, based on the total volume of electrolyte composition (A).

The small molecules of the lithium fluoroalkylphosphates of formula (I) form coordination polymers in the solvent resulting in a gel comprised of a network of the coordination polymer and of solvent molecules distributed within the whole network of the polymers. The gel has a finite yield stress and shows both elastic properties and viscous properties. This is reflected by the development of the storage modulus G' and the loss modulus G" determined via rheological oscillation experiments. In a deformation sweep the storage modulus G' is larger than the loss modulus G" at small deformations, resembling more a solid phase material. This changes at higher deformation values, indicating that the gel behaves more like a fluid. In a frequency sweep experiment at small deformation the storage modulus G' of a gel is larger than the loss modulus G" and both develop parallel, at least for an ideal gel. According to a preferred embodiment of the present invention the electrolyte composition (A) is a gel electrolyte.

The inventive electrolyte composition (A) furthermore contains at least one conducting salt (iii) different from the compounds of formula (I). Electrolyte composition (A) acts as a medium for the transfer of the ions participating in the electrochemical reactions which take place in the electrochemical cell. The conducting salt(s) (ii) present in the electrolyte are usually solvated in the aprotic organic solvent(s) (i). Preferably the conducting salt (iii) is a lithium-ion containing conducting salt. The conducting salt is preferably selected from the group consisting of $Li[F_{6-x}P(C_yF_{2y+1})x]$, wherein x is an integer in the range from 0 to 6 and y is an integer in the range from 1 to 20;

$Li[B(R')_4]$, $Li[B(R')_2(OR"O)]$ and $Li[B(OR"O)_2]$ wherein each R' is independently from each other selected from F, Cl, Br, I, $C_1$-$C_4$ alkyl, $C_2$-$C_4$ alkenyl, $C_2$-$C_4$ alkynyl, $OC_1$-$C_4$ alkyl, $OC_2$-$C_4$ alkenyl, alkenyl, and $OC_2$-$C_4$ alkynyl wherein alkyl, alkenyl, and alkynyl may be substituted by one or more OR''', wherein R''' is selected from $C1$-$C_6$ alkyl, $C_2$-$C_6$ alkenyl, and $C_2$-$C_6$ alkynyl, and (OR"O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

$LiClO_4$; $LiAsF_6$; $LiCF_3SO_3$; $Li_2SiF_6$; $LiSbF_6$; $LiAlCl_4$, lithium tetrafluoro (oxalato) phosphate; lithium oxalate; $LiN(SO_2F)_2$; and salts of the general formula $Li[Z(C_nF_{2n+1}SO_2)_m]$, where m and n are defined as follows:

m=1 when Z is selected from oxygen and sulfur,
m=2 when Z is selected from nitrogen and phosphorus,
m=3 when Z is selected from carbon and silicon, and
n is an integer in the range from 1 to 20.

Suited 1,2- and 1,3-diols from which the bivalent group (OR"O) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated C1-04 alkyl group. An example for such 1,2- or 1,3-diole is 1,1,2,2-tetra(trifluoromethyl)-1,2-ethane diol.

"Fully fluorinated $C_{1\text{-}4}$ alkyl group" means, that all H-atoms of the alkyl group are substituted by F.

Suited 1,2- or 1,3-dicarboxlic acids from which the bivalent group (OR"O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group (OR"O) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of Li[B(R')$_4$], Li[B(R')$_2$(OR"O)] and Li[B(OR"O)$_2$] are LiBF$_4$, lithium difluoro oxalato borate and lithium dioxalato borate.

Preferably the at least one conducting salt (iii) is selected from LiBF$_4$, lithium difluoro oxalato borate, lithium dioxalato borate, Li[N(FSO$_2$)$_2$], Li[N(CF$_3$SO$_2$)$_2$], LiClO$_4$, LiPF$_6$, and LiPF$_3$(CF$_2$CF$_3$)$_3$, more preferred LiPF$_6$, LiBF$_4$, and LiPF$_3$(CF$_2$CF$_3$)$_3$, even more preferred the conducting salt (iii) is selected from LiPF$_6$ and LiBF$_4$, and the most preferred conducting salt (iii) is LiPF$_6$.

The at least one conducting salt (iii) is usually present at a minimum concentration of at least 0.1 mol/L. The maximum concentration is usually 2 mol/L based on the total volume of the electrolyte composition.

The electrolyte composition (A) may contain at least one further additive (iv) which is selected from the group consisting of vinylene carbonate and its derivatives, vinyl ethylene carbonate and its derivatives, methyl ethylene carbonate and its derivatives, lithium (bisoxalato) borate, lithium difluoro (oxalato) borate, lithium tetrafluoro (oxalato) phosphate, lithium oxalate, 2-vinyl pyridine, 4-vinyl pyridine, cyclic exo-methylene carbonates, sultones, cyclic and acyclic sulfonates, cyclic and acyclic sulfites, cyclic and acyclic sulfinates, organic esters of inorganic acids, acyclic and cyclic alkanes having a boiling point at 1 bar of at least 36° C., and aromatic compounds, optionally halogenated cyclic and acyclic sulfonylimides, optionally halogenated cyclic and acyclic phosphate esters, optionally halogenated cyclic and acyclic phosphines, optionally halogenated cyclic and acyclic phosphites including, optionally halogenated cyclic and acyclic phosphazenes, optionally halogenated cyclic and acyclic silylamines, optionally halogenated cyclic and acyclic halogenated esters, optionally halogenated cyclic and acyclic amides, optionally halogenated cyclic and acyclic anhydrides, ionic liquids, and optionally halogenated organic heterocycles. The additive (iv) is preferably selected to be different from the compound selected as conducting salt (iii) present in the respective electrolyte composition (A). Preferably additive (iv) is also different from the at least one organic aprotic solvent (i) present in the respective electrolyte composition (A).

Preferred ionic liquids according to the present invention are selected from ionic liquids of formula [K]$^+$[L]$^-$ in which:

[K]$^+$ denotes a cation, preferably reduction-stable, selected from the cation groups of the general formulae (II) to (IX)

$$NR_3\text{—}R^A \quad (II)$$

$$PR_3\text{—}R^A \quad (III)$$

(IV) pyrrolidinium-type cation with R, R$^A$, X$^A$ (V) piperidinium-type cation with R, R$^A$, X$^A$ (VI) piperazinium-type 2+ cation with R, R$^A$ (VII) phospholanium-type cation with R, R$^A$, X$^A$ (VIII) phosphorinanium-type cation with R, R$^A$, X$^A$ (IX) piperazinium-type 2+ cation with R, R$^A$ wherein R denotes H, $C_1$- to $C_6$-alkyl, $C_2$- to $C_6$-alkenyl, and phenyl, preferably methyl, ethyl, and propyl;

R$^A$ denotes —(CH$_2$)$_s$—O—C(O)—R, —(CH$_2$)$_s$—C(O)—OR, —(CH$_2$)$_s$—S(O)$_2$—OR, —(CH$_2$)$_s$—O—S(O)$_2$—OR, —(CH$_2$)$_s$—O—C(O)—OR, —(CH$_2$)$_s$—HC=CH—R, —(CH$_2$)$_s$—CN, —(CH$_2$)$_s$-epoxide, —(CH$_2$)$_s$-cyclic sulfate, and —(CH$_2$)$_s$-cyclic carbonate, wherein individual CH$_2$ groups may be replaced by O, S or NR and s=1 to 8, preferably s =1 to 3;

X$^A$ denotes CH$_2$, O, S or NR$^B$;

R$^B$ denotes H, $C_1$- to $C_6$-alkyl, $C_2$- to $C_6$-alkenyl, phenyl, and —(CH$_2$)$_s$—CN with s=1 to 8, preferably s=1 to 3; preferably R$^B$ is methyl, ethyl, propyl or H;

and

[L]$^-$ denotes an anion selected from the group BF$_4^-$, PF$_6^-$, [B(C$_2$O$_4$)$_2$]$^-$, [F$_2$B(C$_2$O$_4$)]$^-$, [N(S(O)$_2$F)$_2$]$^-$, [F$_p$P(C$_q$F$_{2q+1}$)$_{6-p}$]$^-$, [N(S(O)$_2$C$_q$F$_{2q+1}$)$_2$]$^-$, [(C$_q$F$_{2q+1}$)$_2$P(O)O]$^-$, [C$_q$F$_{2q+1}$P(O)O$_2$]$^{2-}$, [OC(O)C$_q$F$_{2q+1}$]$^-$, [OS(O)$_2$C$_q$F$_{2q+1}$]$^-$; [N(C(O)C$_q$F$_{2q+1}$)$_2$]$^-$; [N(C(O)C$_q$F$_{2q+1}$)(S(O)$_2$C$_q$F$_{2q+1}$)]$^-$; [N(C(O)C$_q$F$_{2q+1}$)(C(O))F]$^-$; [N(S(O)$_2$C$_q$F$_{2q+1}$)(S(O)$_2$F)]$^-$;

[C(C(O)C$_q$F$_{2q+1}$)$_3$]$^-$; and [C(S(O)$_2$C$_q$F$_{2q+1}$)$_3$N(SO$_2$CF$_3$)$_2$]$^-$, wherein p is an integer in the range from 0 to 6 and q is an integer in the range from 1 to 20, preferably q is an integer in the ranger from 1 to 4.

Preferred ionic liquids for use as additive (iv) are ionic liquids of formula [K][L] in which [K] is selected from pyrrolidinium cations of formula (II) with X is CH$_2$ and s is an integer in the range of from 1 to 3 and [L] is selected from the group consisting of BF$_4$$^-$, PF$_6$$^-$, [B(C$_2$O$_4$)$_2$]$^-$, [F$_2$B(C$_2$O$_4$)]$^-$, [N(S(O)$_2$F)$_2$]$^-$, [N(SO$_2$C$_2$F$_5$)$_2$$^2$]$^-$, [F$_3$P(C$_2$F$_5$)$_3$]$^-$, and [F$_3$P(C$_4$F$_9$)$_3$]$^-$.

If one or more further additives (iv) are present in the electrolyte composition (A), the total concentration of further additives (iv) is at least 0.001 wt.-%, preferred 0.005 to 5 wt.-% and most preferred 0.01 to 2 wt.-%, based on the total weight of the electrolyte composition (A).

The electrolyte composition (A) may be prepared via providing a mixture of the at least one solvent (i) and the at least one conducting salt (iii) and optionally one or more additives (iv) and adding the compound(s) of formula (I) and mixing all components. In certain cases it is helpful to treat the solution in an ultrasonic bath to enhance the homogeneity of the gel.

A further object of the present invention is the use of a compound of formula (I) as defined above in detail including preferred embodiments as gelling agent in an aprotic organic solvent or mixture of solvents. Typical aprotic organic solvents are the solvents described above as aprotic organic solvents (i) in detail including preferred embodiments. Preferably the aprotic organic solvent(s) are selected from cyclic and noncyclic organic carbonates. Usually the compounds of formula (I) are used as gelling agent in the concentration range of 0.1 to 5 mol/L, more preferred 0.15 to 3 mol/L and most preferred 0.2 to 2 mol/L of the at least one compound of formula (I), based on the total volume of the composition containing aprotic organic solvent(s) and compound(s) of formula (I). Preferably the compounds of formula (I) are used as gelling agents in non-aqueous electrolyte compositions containing aprotic organic solvent(s). An additional object of the present invention is a method of gelling an aprotic organic solvent or mixture of aprotic organic solvents by adding at least one compound of formula (I) to the aprotic organic solvent or mixture of aprotic organic solvents as described above. The term "to gel" means to induce gelation of the aprotic organic solvent or mixture of aprotic organic solvents to obtain a gel comprising the aprotic organic solvent or mixture of aprotic organic solvents and the at least one compound of formula (I) and optionally additional compounds, e.g. conducting salts and additives as described above as conducting salts (iii) and additives (iv).

Another object of the present invention is the use of at least one compound of formula (I) as additive in electrolytes for electrochemical cells. Usually the compounds of formula (I) are used in the concentration ranges described above for the inventive electrolyte composition (A).

Another object of the present invention is an electrochemical cell comprising the electrolyte composition (A) as described above in detail. In particular the electrochemical cell comprises (A) the electrolyte composition as described above, (B) at least one cathode comprising at least one cathode active material, and (C) at least one anode comprising at least one anode active material.

The inventive electrochemical cell is preferably a lithium battery, i.e. an electrochemical cell, wherein the anode comprises lithium metal or lithium ions somewhere during the charge/discharge of the cell. The anode may comprise lithium metal or a lithium metal alloy, lithium containing compounds or a material incorporating lithium ions; e.g. a lithium ion battery, a lithium/sulphur battery, or a lithium/selenium sulphur battery. Preferably the electrochemical cell is a lithium ion secondary battery or a lithium sulphur battery.

A lithium/sulphur battery comprises as cathode active material sulphur containing materials. The sulphur is usually present as mixture or composite with a conductive material, particularly preferred with carbonaceous conductive materials like carbon black, graphite, expanded graphite, graphen, carbon fibres, carbon nanotubes, activated carbon, carbon prepared by heat treating cork or pitch. It is also possible to use other conductive materials like metal powder, metal flakes, metal compounds or mixtures thereof. Mixtures and composites containing sulphur are often prepared from elemental sulphur or sulphur containing polymers.

The lithium anode usually comprises lithium metal and/or a lithium metal alloy. For lithium/sulphur batteries lithium-aluminium alloys, lithium-tin alloys, Li—Mg-alloys and Li—Ag-alloys may be used.

Preferably the electrochemical cell is a secondary lithium ion electrochemical cell or a lithium sulphur cell, i.e. secondary lithium ion electrochemical cell comprising a cathode comprising a cathode active material that can reversibly occlude and release lithium ions and an anode comprising an anode active material that can reversibly occlude and release lithium ions. The terms "secondary lithium ion electrochemical cell" and "(secondary) lithium ion battery" are used interchangeably within the present invention.

The at least one cathode active material preferably comprises a material capable of occluding and releasing lithium ions selected from lithiated transition metal phosphates and lithium ion intercalating transition metal oxides.

An example of lithiated transition metal phosphates is LiCoPO$_4$, examples of lithium ion intercalating transition metal oxides are transition metal oxides with layer structure having the general formula (X) Li$_{(1+z)}$[Ni$_a$Co$_b$Mn$_c$]$_{(1-z)}$O$_{2+e}$ wherein z is 0 to 0.3; a, b and c may be same or different and are independently 0 to 0.8 wherein a+b+c=1; and −0.1≤e≤0.1, and manganese-containing spinels of general formula (XI) Li$_{1+t}$M$_{2-t}$O$_{4-d}$ wherein d is 0 to 0.4, t is 0 to 0.4 and M is Mn and at least one further metal selected from the group consisting of Co and Ni, and Li$_{(1+g)}$[Ni$_h$Co$_i$Al$_j$]$_{1-g}$O$_{2+k}$. Typical values for g, h, I, j and k are: g=0, h=0.8 to 0.85, i=0.15 to 0.20, j=0.02 to 0.03 and k=0.

In one preferred embodiment the cathode active material is selected from LiCoPO$_4$. The cathode containing LiCoPO$_4$ as cathode active material may also be referred to as LiCoPO$_4$ cathode. The LiCoPO$_4$ may be doped with Fe, Mn, Ni, V, Mg, Al, Zr, Nb, Tl, Ti, K, Na, Ca, Si, Sn, Ge, Ga, B, As, Cr, Sr, or rare earth elements, i.e., a lanthanide, scandium and yttrium. LiCoPO$_4$ with olivine structure is particularly suited according the present invention due to its high operating voltage (red-ox potential of 4.8 V vs. Li/Li$^+$), flat voltage profile and a high theoretical capacity of about 170 mAh/g. The cathode may comprise a LiCoPO$_4$/C composite material. The preparation of a suited cathode comprising a LiCoPO$_4$/C composite material is described in Markevich et al., Electrochem. Comm., 2012, 15, 22-25.

In another preferred embodiment of the present invention the cathode active material is selected from transition metal oxides with layer structure having the general formula (X) Li$_{(1+z)}$[Ni$_a$Co$_b$Mn$_c$]$_{(1-z)}$O$_{2+e}$ wherein z is 0 to 0.3; a, b and c may be same or different and are independently 0 to 0.8 wherein a+b+c=1; and −0.1≤e≤0.1. Preferred are transition metal oxides with layer structure having the general formula (X) $Li_{(1+z)}[Ni_aCo_bMn_c]_{1-z}O_{2+e}$ wherein z is 0.05 to 0.3, a=0.2 to 0.5, b=0 to 0.3 and c=0.4 to 0.8 wherein a+b+c=1; and −0.1≤e≤0.1. In one embodiment of the present invention, the transition metal oxides with layer structure of general formula (X) are selected from those in which $[Ni_aCo_bMn_c]$ is selected from $Ni_{0.33}Co_0Mn_{0.66}$, $Ni_{0.25}Co_0Mn_{0.75}$, $Ni_{0.35}Co_{0.15}Mn_{0.5}$, $Ni_{0.21}Co_{0.08}Mn_{0.71}$ and $Ni_{0.22}Co_{0.12}Mn_{0.66}$, in particular preferred are $Ni_{0.21}Co_{0.08}Mn_{0.71}$ and $Ni_{0.22}Co_{0.12}Mn_{0.66}$. The transition metal oxides of general formula (X) are also called High Energy NCM (HE-NCM) since they have higher energy densities than usual NCMs. Both HE-NCM and NCM have operating voltage of about 3.3 to 3.8 V against Li/Li$^+$, but high cut off voltages (>4.6 V) have to be used for charging HE-NCMS to actually accomplish full charging and to benefit from their higher energy density.

According to a further preferred embodiment of the present invention the cathode active material is selected from manganese-containing spinels of general formula (XI) $Li_{1+t}M_{2-t}O_{4-d}$ wherein d is 0 to 0.4, t is 0 to 0.4 and M is Mn and at least one further metal selected from the group consisting of Co and Ni. An example of a suited manganese-containing spinel of general formula (XI) is $LiNi_{0.5}Mn_{1.5}O_{4-d}$. These spinels are also called HE (high energy)-spinels.

Many elements are ubiquitous. For example, sodium, potassium and chloride are detectable in certain very small proportions in virtually all inorganic materials. In the context of the present invention, proportions of less than 0.5% by weight of cations or anions are disregarded, i.e.

amounts of cations or anions below 0.5% by weight are regarded as non-significant. Any lithium ion-containing transition metal oxide comprising less than 0.5% by weight of sodium is thus considered to be sodium-free in the context of the present invention. Correspondingly, any lithium ion-containing mixed transition metal oxide comprising less than 0.5% by weight of sulfate ions is considered to be sulfate-free in the context of the present invention.

The cathode may further comprise electrically conductive materials like electrically conductive carbon and usual components like binders. Compounds suited as electrically conductive materials and binders are known to the person skilled in the art. For example, the cathode may comprise carbon in a conductive polymorph, for example selected from graphite, carbon black, carbon nanotubes, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

Furthermore, the cathode may comprise a current collector which may be a metal wire, a metal grid, a metal web, a metal sheet, a metal foil or a metal plate. A suited metal foil is aluminum foil.

According to one embodiment of the present invention the cathode has a thickness of from 25 to 200 μm, preferably of from 30 to 100 μm, based on the whole thickness of the cathode without the thickness of the current collector.

The anode (C) comprised within the lithium ion secondary battery of the present invention comprises an anode active material that can reversibly occlude and release lithium ions. In particular carbonaceous material that can reversibly occlude and release lithium ions can be used as anode active material. Carbonaceous materials suited are crystalline carbon such as a graphite material, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber.

Further anode active materials are lithium metal, or materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material is silicon which is able to store lithium ions. The silicon may be used in different forms, e.g. in the form of nanowires, nanotubes, nanoparticles, films, nanoporous silicon or silicon nanotubes. The silicon may be deposited on a current collector. The current collector may be a metal wire, a metal grid, a metal web, a metal sheet, a metal foil or a metal plate. Preferred the current collector is a metal foil, e.g. a copper foil. Thin films of silicon may be deposited on metal foils by any technique known to the person skilled in the art, e.g. by sputtering techniques. One possibility of preparing Si thin film electrodes are described in R. Elazari et al.; *Electrochem. Comm.* (2012), 14, 21-24. It is also possible to use a silicon/carbon composite as anode active material according to the present invention.

Other possible anode active materials are lithium ion intercalating oxides of Ti.

Preferably the anode active material present in the inventive lithium ion secondary battery is selected from carbonaceous material that can reversibly occlude and release lithium ions, particularly preferred the carbonaceous material that can reversibly occlude and release lithium ions is selected from crystalline carbon, hard carbon and amorphous carbon, in particular preferred is graphite. In another preferred embodiment the anode active material present in the inventive lithium ion secondary battery is selected from silicon that can reversibly occlude and release lithium ions, preferably the anode comprises a thin film of silicon or a silicon/carbon composite. In a further preferred embodiment the anode active material present in the inventive lithium ion secondary battery is selected from lithium ion intercalating oxides of Ti.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive electrochemical cells may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin separators.

Several inventive electrochemical cells may be combined with one another, for example in series connection or in parallel connection. Series connection is preferred. The present invention further provides for the use of inventive electrochemical cells as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers. But the inventive lithium ion batteries can also be used for stationary energy stores.

The invention is illustrated by the examples which follow, which do not, however, restrict the invention.

1. Preparation of Compounds of Formula (I)

1a) lithium bis-(2,2,2-trifluoroethyl)phosphate LiOOP(OCH$_2$CF$_3$)2 (compound 1) Lithium bis-(2,2,2-trifluoroethyl)phosphate was prepared by reaction of 8 mol 2,2,2-trifluoroethanol with 1 mol P$_4$O$_{10}$ (both Alfa Aesar). The reaction product was purified via rectification and bis-(2,2,2-trifouroethyl)phosphoric acid was obtained in form of colorless crystals. The acid was solved in diethylether, cooled and a slurry of LiH in diethylether was added. After evaporation of the solvent lithium bis-(2,2,2-trifluoroethyl)phosphate was obtained as white powder.

1b) lithium bis-(1,1,1,3,3,3,-hexafluoroisopropyl)phosphate LiOOP(OCH(CF$_3$)$_2$)2 (compound 2) An ice-cooled mixture of 1 mol P$_4$O$_{10}$ in dimethylcarbonat is loaded with a suspension of 8 mol Li[OCH(CF$_3$)$_2$]. Then, the cooling is removed and the mixture is heated under reflux for 3 h. Afterwards, the volume of the reaction mixture is reduced by 80% in vacuum. CH$_2$Cl$_2$ is added and the mixture is stirred for 4 h. The white precipitate of LiOOP(OCH(CF3)2)2 is filtered, washed with cold CH$_2$Cl$_2$ and dried in vacuum.

2. Electrolyte Compositions

Mixtures of ethylene carbonate (EC) and dimethyl carbonate (DMC) in a volume ratio of 1:1 and 1M LiPF$_6$ or 1M LiBF$_4$ were prepared as comparative examples. The mixture containing LiPF$_6$ was also used to prepare inventive gel electrolyte compositions. Different amounts of lithium bis-(2,2,2-trifluoroethyl)phosphate were added to the LiPF$_6$ containing mixture. The mixtures were optionally treated in an ultrasonic bath for several hours and superfluous solvent was separated by decantation or optionally by centrifugation. In such cases only very small amounts of superfluous solvents were removed. The concentrations given refer to the samples before separation of superfluous solvents. All inventive compositions had the appearance of a homogenous gel.

2a) Conductivity

The conductivities were measured with a Metrohm SevenMulti conductometer which was equipped with a InLab710 probe at 25° C. The results are shown in Table 1.

TABLE 1

| | Electrolyte composition | Conductivity [mS/cm] |
|---|---|---|
| Comparative example 1 | EC/DMC/1M LiPF$_6$ | 10.25 |
| Comparative example 2 | EC/DMC/1M LiBF$_4$ | 4.76 |
| Inventive example 1 | 0.5 mol/L compound 1 in EC/DMC/1MLiPF$_6$ without ultrasonic treatment | 7.41 |
| Inventive example 2 | 0.9 mol/L compound 1 in EC/DMC/1M LiPF$_6$ with ultrasonic treatment and centrifugation | 6.40 |
| Inventive example 3 | 1 mol/L compound 1 in EC/DMC/1M LiPF$_6$ with ultrasonic treatment and centrifugation | 6.01 |
| Inventive example 4 | 1.07 mol/L compound 1 in EC/DMC/1M LiPF$_6$ with ultrasonic treatment and centrifugation | 5.89 |
| Inventive example 5 | 0.5 mol/L compound 1 in EC/DMC treated in ultrasonic bath without centrifugation | 0.037 |

Inventive example 5 shows lower conductivity than the compositions containing a conducting salt, but was a gel.

2b) Rheology

Rheological measurements were performed at room temperature with inventive example 1. A rotary rheometer with a plate-pate geometry having a diameter of 25 mm and a gap of 200 microns was used. The sample was surrounded with a silicon oil to avoid evaporation of the sample. The result of a deformation sweep is shown in FIG. 1, the results of an oscillation sweep in shown in FIG. 2. G' denotes the elasticity modulus, G" denotes the loss modulus, γ the deformation and ω is the angular frequency. As can be seen from FIG. 1 (Frequence sweep. Storage and loss modulus (in Pascal) versus radial frequence (rad/s)) and 2 (Deformation sweep. Storage and loss modulus (in Pascal) versus deformation (%)), the inventive electrolyte composition 1 shows the rheological behavior of a gel.

2c) Cyclovoltametry

Figure 3:
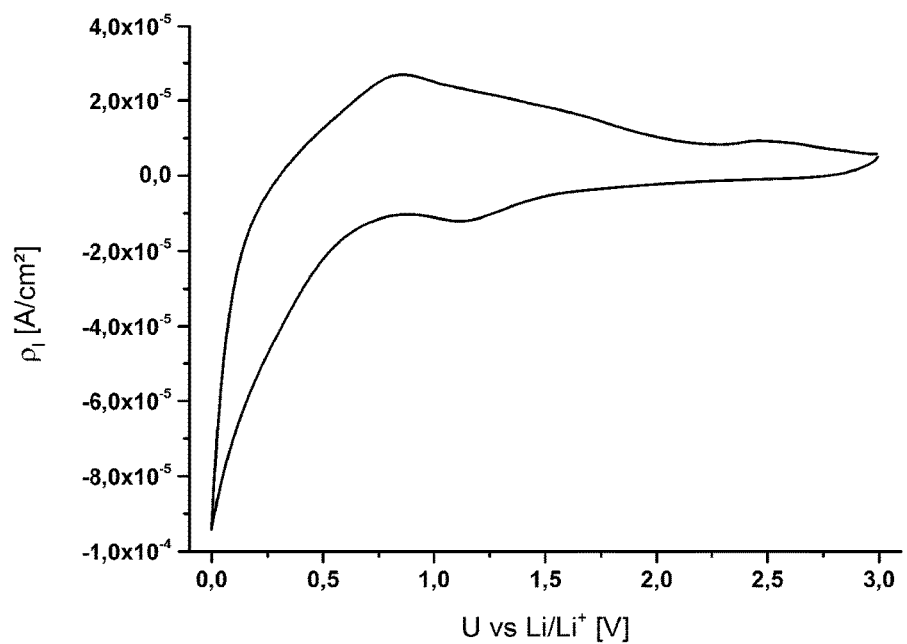
FIG. 3 shows the result of a cyclovoltametric measurement.
Figure 4:
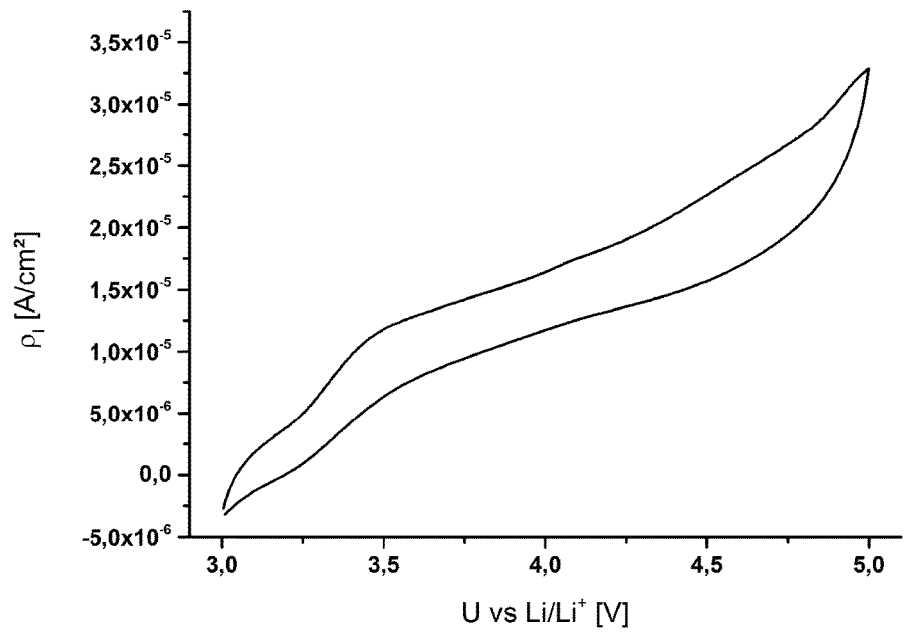
FIG. 4 shows the result of a cyclovoltametric measurement.

Cyclovoltametric measurements were carried out with a Metrohm Autolab PGStat101 equipped with a platinum working electrode (1 mm diameter) and a working and reference electrode made from lithium foil. The scan rate was set to 10 mV per second. The electrolyte was composed by 1 mol/L Li[PF$_6$] in EC/DMC (1:1) mixed with 1 mol/L of LiOOP(OCH$_2$CF$_3$)$_2$. The results are shown in FIGS. 3 and 4 (Cyclic voltammograms of LiOOP(OCH$_2$CF$_3$)$_2$ in 1 mol/L Li[PF$_6$] in EC/DMC (1:1)).

2d) Performance Testing

Button cells were fabricated using lithium nickel cobalt manganese oxide (NCM 111) electrodes with a capacity of 2 mAh/cm$^2$ and a graphite electrode with a capacity of 2.15 mAh/cm$^2$. A glass-fiber filter separator (Whatmann GF/D) was used as separator, which was soaked with 100 µl of electrolyte. The electrolyte was composed of 1 mol/L Li[PF$_6$] in EC/DMC (1:1) mixed with 0.235 mol/L of LiOOP$_2$(OCH$_2$CF$_3$)$_2$. All electrochemical measurements were carried out at 25° C. in climate chambers. The performance of the cell was measured with regard to the cycling number according to the procedure shown in Table 2.

TABLE 2

| Cycle | Charge-/discharge rate in C |
|---|---|
| 1 | 0.1 |
| 2 | 0.2 |
| 3-12 | 0.5 |
| 13-15 | 1 |
| 16-18 | 2 |
| 19-21 | 4 |
| 22-75 | 1 |

Repeat procedure from cycle 3

Figure 5:
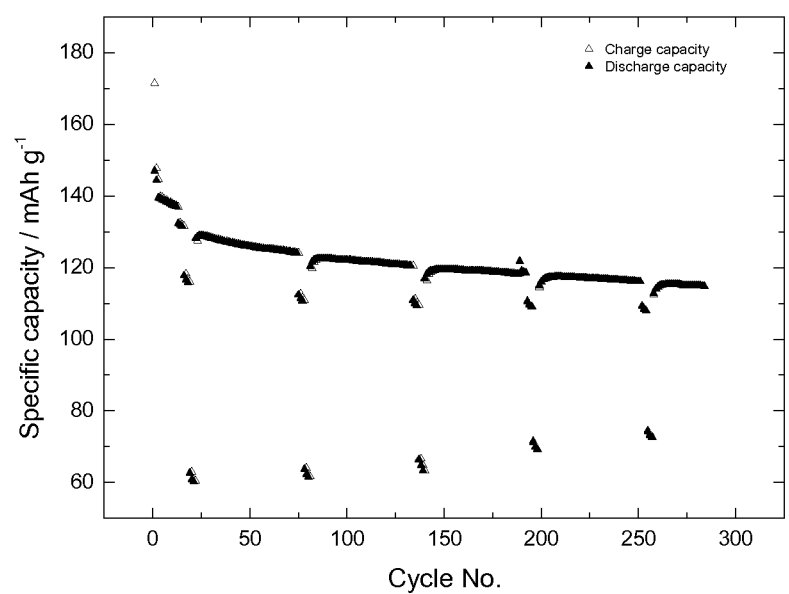
FIG. 5 shows the dependence of the specific capacity of an electrolyte composed of 1 mol/L $Li[PF_6]$ in EC/DMC (1:1) mixed with 0.235 mol/L of $LiOOP_2(OCH_2CF_3)_2$ on the cycle number.

The specific capacity of the electrolyte composed of 1 mol/L Li[PF$_6$] in EC/DMC (1:1) mixed with 0.235 mol/L of LiOOP$_2$(OCH$_2$CF$_3$)$_2$ depending on the cycle number is shown in FIG. 5, open triangles denote the specific capacity during charge, full triangles denote the specific capacity during discharge.

The invention claimed is:

1. A method for preparing a gel electrolyte composition, comprising adding a compound of formula (I) to an aprotic organic solvent or to a mixture of aprotic organic solvents, to obtain a gel electrolyte composition

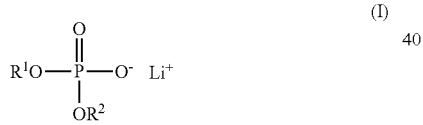

(I)

wherein
R$^1$ and R$^2$ are each independently C$_1$-C$_{10}$ alkyl, which may be substituted by one or more F,
or wherein R$^1$ and R$^2$ are linked and are jointly C$_2$-C$_3$ alkanediyl forming together with the group —OPO— a five- or six-membered heterocycle which may be substituted by one or more substituents selected from the group consisting of F and optionally fluorinated C$_1$-C$_{10}$ alkyl.

2. The method according to claim 1, wherein at least one of R$^1$ and R$^2$ in the compound of formula (I) is substituted by at least one F.

3. The method according to claim 1, wherein at least one of R$^1$ and R$^2$ in the compound of formula (I) is substituted by at least three F.

4. The method according to claim 1, wherein at least one of R$^1$ and R$^2$ in the compound of formula (I) contains at least one CF$_3$-group.

5. The method according to claim 1, wherein R$^1$ and R$^2$ are each independently C$_1$-C$_4$ alkyl which is substituted by one or more F, or wherein R$^1$ and R$^2$ are linked and are jointly C$_2$-alkanediyl which may be substituted by one or more substituents selected from the group consisting of F and optionally fluorinated C$_1$-C$_{10}$ alkyl.

6. The method according to claim 1, wherein the compound of formula (I) is selected from the group consisting of LiOOP(OCH$_2$CF$_3$)$_2$, LiOOP(OCH(CF$_3$)$_2$)$_2$, LiOOP(On-C$_4$F$_9$)$_2$, and LiOOP(OC(CF$_3$)$_3$)$_2$.

7. The method according to claim 1, wherein the compound of formula (I) is present in the gel electrolyte composition in a concentration range of 0.01 to 5 mol/L based on the total volume of the composition.

8. The method according to claim 1, wherein the aprotic organic solvent or mixture of aprotic organic solvents comprises a cyclic or a noncyclic organic carbonate.

9. The method according to claim 1, wherein the aprotic organic solvent or mixture of aprotic organic solvents further comprises at least one conducting salt.

10. A process for preparing a compound of formula (I)

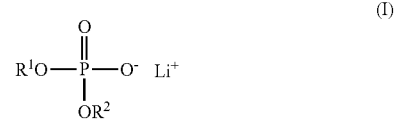

(I)

wherein
R$^1$ and R$^2$ are each independently C$_1$-C$_{10}$ alkyl, which may be substituted by one or more F,
or wherein R$^1$ and R$^2$ are linked and are jointly C$_2$-C$_3$ alkanediyl forming together with the group —OPO— a five- or six-membered heterocycle which may be substituted by one or more substituents selected from the group consisting of F and optionally fluorinated C$_1$-C$_{10}$ alkyl,
the process comprising: reacting LiOR$^1$, LiOR$^2$ and/or LiOR$^1$R$^2$OLi with phosphorus pentoxide.

* * * * *

UNITED STATES PATENT AND TRADEMARK OFFICE
CERTIFICATE OF CORRECTION

PATENT NO. : 10,074,873 B2  
APPLICATION NO. : 15/121613  
DATED : September 11, 2018  
INVENTOR(S) : Arnd Garsuch et al.

Page 1 of 4

It is certified that error appears in the above-identified patent and that said Letters Patent is hereby corrected as shown below:

On the Title Page

In Column 2, item (57), Abstract, Line 2, delete "C1-C10" and insert -- $C_1$-$C_{10}$ --, therefor.

In Column 2, item (57), Abstract, Line 4, delete "C2-C3" and insert -- $C_2$-$C_3$ --, therefor.

In the Drawings

Figure 2:
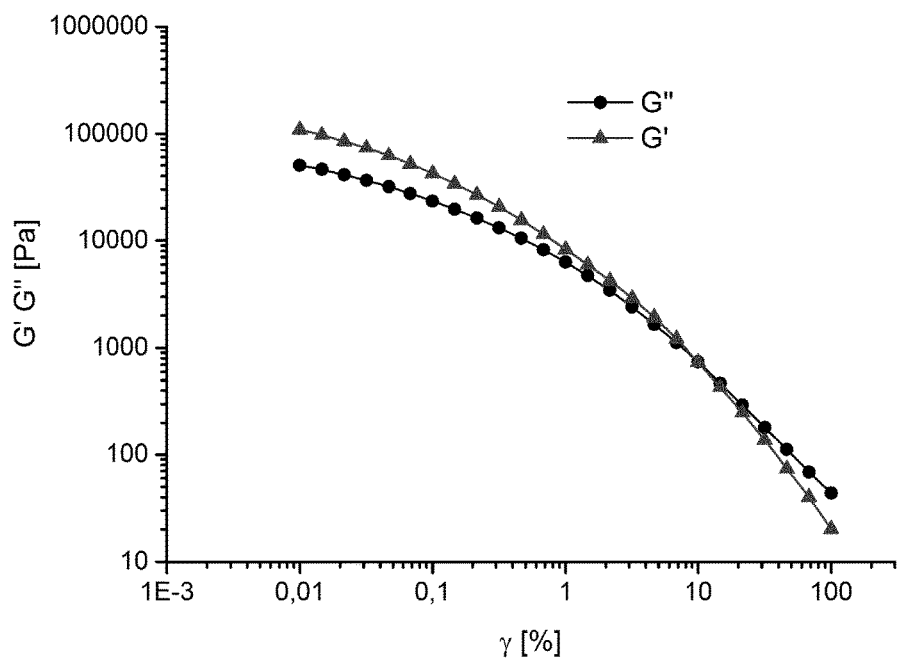
FIG. 2 shows the result of an oscillation sweep of a rheological measurement.

In sheet 1 of 3, FIG. 2, in X-axis, sequence numeral 2, delete "0,01" and insert -- 0.01 --, therefor.

In sheet 1 of 3, FIG. 2, in X-axis, sequence numeral 3, delete "0,1" and insert -- 0.1 --, therefor.

In sheet 2 of 3, FIG. 3, in Y-axis, sequence numeral 1, delete "4,0" and insert -- 4.0 --, therefor.

In sheet 2 of 3, FIG. 3, in Y-axis, sequence numeral 2, delete "2,0" and insert -- 2.0 --, therefor.

In sheet 2 of 3, FIG. 3, in Y-axis, sequence numeral 3, delete "0,0" and insert -- 0.0 --, therefor.

In sheet 2 of 3, FIG. 3, in Y-axis, sequence numeral 4, delete "-2,0" and insert -- -2.0 --, therefor.

In sheet 2 of 3, FIG. 3, in Y-axis, sequence numeral 5, delete "-4,0" and insert -- -4.0 --, therefor.

In sheet 2 of 3, FIG. 3, in Y-axis, sequence numeral 6, delete "-6,0" and insert -- -6.0 --, therefor.

In sheet 2 of 3, FIG. 3, in Y-axis, sequence numeral 7, delete "-8,0" and insert -- -8.0 --, therefor.

In sheet 2 of 3, FIG. 3, in Y-axis, sequence numeral 8, delete "-1,0" and insert -- -1.0 --, therefor.

In sheet 2 of 3, FIG. 3, in X-axis, sequence numeral 1, delete "0,0" and insert -- 0.0 --, therefor.

Signed and Sealed this  
Twenty-sixth Day of May, 2020

Andrei Iancu  
*Director of the United States Patent and Trademark Office*

In sheet 2 of 3, FIG. 3, in X-axis, sequence numeral 2, delete "0,5" and insert -- 0.5 --, therefor.

In sheet 2 of 3, FIG. 3, in X-axis, sequence numeral 3, delete "1,0" and insert -- 1.0 --, therefor.

In sheet 2 of 3, FIG. 3, in X-axis, sequence numeral 4, delete "1,5" and insert -- 1.5 --, therefor In sheet 2 of 3, FIG. 3, in X-axis, sequence numeral 5, delete "2,0" and insert -- 2.0 --, therefor.

In sheet 2 of 3, FIG. 3, in X-axis, sequence numeral 6, delete "2,5" and insert -- 2.5 --, therefor.

In sheet 2 of 3, FIG. 3, in X-axis, sequence numeral 7, delete "3,0" and insert -- 3.0 --, therefor In sheet 2 of 3, FIG. 4, in Y-axis, sequence numeral 1, delete "3,5" and insert -- 3.5 --, therefor.

In sheet 2 of 3, FIG. 4, in Y-axis, sequence numeral 2, delete "3,0" and insert -- 3.0 --, therefor.

In sheet 2 of 3, FIG. 4, in Y-axis, sequence numeral 3, delete "2,5" and insert -- 2.5 --, therefor.

In sheet 2 of 3, FIG. 4, in Y-axis, sequence numeral 4, delete "2,0" and insert -- 2.0 --, therefor In sheet 2 of 3, FIG. 4, in Y-axis, sequence numeral 5, delete "1,5" and insert -- 1.5 --, therefor.

In sheet 2 of 3, FIG. 4, in Y-axis, sequence numeral 6, delete "1,0" and insert -- 1.0 --, therefor.

In sheet 2 of 3, FIG. 4, in Y-axis, sequence numeral 7, delete "5,0" and insert -- 5.0 --, therefor.

In sheet 2 of 3, FIG. 4, in Y-axis, sequence numeral 8, delete "0,0" and insert -- 0.0 --, therefor.

In sheet 2 of 3, FIG. 4, in Y-axis, sequence numeral 9, delete "-5,0" and insert -- -5.0 --, therefor.

In sheet 2 of 3, FIG. 4, in X-axis, sequence numeral 1, delete "3,0" and insert -- 3.0 --, therefor.

In sheet 2 of 3, FIG. 4, in X-axis, sequence numeral 2, delete "3,5" and insert -- 3.5 --, therefor.

In sheet 2 of 3, FIG. 4, in X-axis, sequence numeral 3, delete "4,0" and insert -- 4.0 --, therefor.

In sheet 2 of 3, FIG. 4, in X-axis, sequence numeral 4, delete "4,5" and insert -- 4.5 --, therefor.

In sheet 2 of 3, FIG. 4, in X-axis, sequence numeral 5, delete "5,0" and insert -- 5.0 --, therefor.

In the Specification

In Column 2, Line 56, delete "cyclovoltametric" and insert -- cyclovoltammetric --, therefor.

In Column 2, Line 58, delete "cyclovoltametric" and insert -- cyclovoltammetric --, therefor.

CERTIFICATE OF CORRECTION (continued)

In Column 4, Line 2, delete "CI" and insert -- Cl --, therefor.

In Column 8, Line 23, delete "X]," and insert -- $_x$], --, therefor.

In Column 8, Line 29, delete "alkenyl, alkenyl," and insert -- alkenyl, --, therefor.

In Column 8, Line 32, delete "C1-C$_6$" and insert -- $C_1$-$C_6$ --, therefor.

In Column 8, Line 35, delete "dicarboxlic" and insert -- dicarboxylic --, therefor.

In Column 8, Line 55, delete "C1-04" and insert -- $C_1$-$C_4$ --, therefor.

In Column 8, Line 58, delete "C$_{1-4}$" and insert -- $C_1$-$C_4$ --, therefor.

In Column 10, Lines 28-35 (approx.), delete " " and insert -- 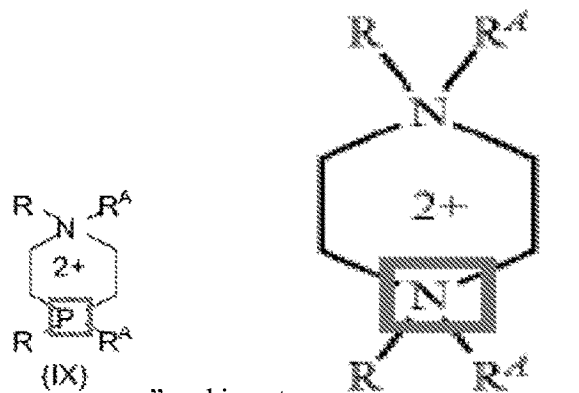 --, therefor.

In Column 10, Line 57, delete "NRB;" and insert -- NR$^B$; --, therefor.

In Column 12, Lines 12-13, delete "graphen," and insert -- graphene, --, therefor.

In Column 12, Line 46, delete "]$_{1-g}$" and insert -- ]$_{(1-g)}$ --, therefor.

In Column 12, Line 47, delete "I," and insert -- i, --, therefor.

In Column 12, Line 53, delete "TI," and insert -- Tl, --, therefor.

In Column 13, Line 3, delete "]$_{1-z)}$" and insert -- ]$_{(1-z)}$ --, therefor.

In Column 13, Line 56, delete "polyvinlyidene" and insert -- polyvinylidene --, therefor In Column 13, Line 57, delete "polyvinly" and insert -- polyvinyl --, therefor.

In Column 15, Line 47, delete "CF$_3$)2" and insert -- CF$_3$)$_2$ --, therefor.

In Column 15, Line 51, delete "trifouroethyl)" and insert -- trifluoroethyl) --, therefor.

CERTIFICATE OF CORRECTION (continued)
U.S. Pat. No. 10,074,873 B2

In Column 15, Line 57, delete ")$_2$)2" and insert -- )$_2$)$_2$ --, therefor.

In Column 15, Line 58, delete "dimethylcarbonat" and insert -- dimethylcarbonate --, therefor.

In Column 15, Line 63, delete "(CF3)2)2" and insert -- (CF$_3$)$_2$)$_2$ --, therefor.

In Column 16, Line 57 (approx.), delete "Cyclovoltametry" and insert -- Cyclovoltammetry --, therefor.

In Column 16, Line 58 (approx.), delete "Cyclovoltametric" and insert -- Cyclovoltammetric --, therefor.

In Column 17, Line 5, delete "(Whatmann" and insert -- (Whatman --, therefor.